United States Patent [19]
Chambers

[11] 4,097,863
[45] Jun. 27, 1978

[54] MARINE RADAR SYSTEM WITH INDEPENDENT SWITCHED POWER SUPPLIES

[75] Inventor: Derek Chambers, Bedford, N.H.

[73] Assignee: Raytheon Company, Lexington, Mass.

[21] Appl. No.: 712,300

[22] Filed: Aug. 6, 1976

[51] Int. Cl.² ............................ G01S 9/00; H02M 3/22
[52] U.S. Cl. ................................. 343/5 R; 343/5 DP; 363/16
[58] Field of Search ............... 343/5 R, 5 DP, 17.1 R, 343/ 5 SC; 325/494, 492; 363/25, 26, 16, 23

[56] References Cited

U.S. PATENT DOCUMENTS

| | | | |
|---|---|---|---|
| 3,400,392 | 9/1968 | Willcox et al. | 343/225 |
| 3,803,600 | 4/1974 | Brandao et al. | 343/5 DP |
| 3,818,307 | 6/1974 | Hamilton et al. | 363/25 |
| 3,859,586 | 1/1975 | Wadlington | 321/18 |
| 3,925,715 | 12/1975 | Venable | 321/2 |

Primary Examiner—Maynard R. Wilbur
Assistant Examiner—Lawrence Goodwin
Attorney, Agent, or Firm—J. D. Pannone; M. D. Bartlett; H. W. Arnold

[57] ABSTRACT

A marine radar system having a constant brightness display presentation upon all range settings and with independent switched power supplies for both the MTR and indicator units. The switching frequencies of the power supplies are independent from each other and those of the data clocks and PRF with the switching frequencies of the power supplies being intermediate those of the data clocks and PRF. Means is provided for switching the bandwidth of the system in accordance with the range setting. A digital STC circuit and a North stabilization device are also provided.

3 Claims, 8 Drawing Figures

FIG. 1
RADAR SYSTEM, 100

FIG. 6
CHOPPER CONTROL, 202

FIG. 7
BASE DRIVER, 250

MARINE RADAR SYSTEM WITH INDEPENDENT SWITCHED POWER SUPPLIES

BACKGROUND OF THE INVENTION

1. Field of the Invention

The invention relates generally to a marine radar system and particularly to such a system in which interference caused by variations in power supply output voltages is substantially eliminated. The invention particularly relates to such systems having digital processing of radar return signals.

2. Description of the Prior Art

In marine radar systems it is particularly desirable to provide power supplies which are both light and which provide electrical DC power to the indicator and modulator-transmitter units which is substantially free of interference caused by variations in the DC output voltages. Such light weight and efficient power supplies are particularly desirable when it is required to separate the indicator and modulator-transmitter units as it is frequently necessary to separate one from the other.

Early versions of such power supplies used series pass regulators to achieve control of the output voltages. Such supplies tended to be somewhat inefficient, bulky, and expensive due to the high percentage of total power dissipated in the pass transistor devices. Later, switching power supplies were used but with frequencies typically of 1 KHz or less. The use of such frequencies frequently caused interference with the indicator unit as variations in the supply output voltages at the internal chopping or switching rate were nearly the same as or lower than the PRF rate of the radar system.

With the introduction of marine type radars employing digital processing of radar returned signals, other problems arose involving power supply caused interference. The incoming video analog signal had to be digitized at a high enough rate commensurate with the overall bandwidth requirements of the radar system.

SUMMARY OF THE INVENTION

Accordingly, it is an object of the present invention to provide a radar system in which interference effects between the variations in a power supply output and the operations of the systems indicator and modulator-transmitter are substantially eliminated.

It is further an object of the present invention to provide such a system having digital processing of radar return signals in which interference is eliminated between power supply outputs and signal processing circuitry.

These, as well as other objects of the invention, may be met by providing the combination of means for transmitting radar pulse signals at a first rate, means for providing digital samples of radar return signals at a second rate, and switching power supplying means for providing electrical power to the transmitting means, the switching means operating at a third rate intermediate the first and second rates. The combination may further include means for storing the digital samples and means for reading out the digital samples from the storing means at a fourth rate which is less than or equal to the second rate. The samples are read into the storing means at the second rate which is variable in accordance with a radar range setting. The fourth rate is preferably constant among at least some of the radar settings.

Objects of the invention may also be met by providing the combination of means for transmitting radar signals at a first rate, means for providing digital samples of the radar return signals at a second rate, and power supplying means for providing electrical power to the transmitting means and the sample providing means wherein the power supplying means has first switching means operating at a third rate for producing a first regulated DC voltage and second switching means operating at a similar switching rate for producing a plurality of output DC voltages wherein the third rate is intermediate the first and second rates. The first and second switching means each preferably comprise one or more switching transistors. The combination may further include means for producing one or more signals for operating the first switching means at the third rate and means for producing one or more signals for operating the second switching means at the similar rate. The means for producing one or more signals for operating the first switching means preferably produces pulses at the third rate. In a preferred embodiment, the first switching means comprises a single switching transistor or a plurality of switching transistors operated in parallel with one another. The second switching means preferably comprises at least two transistors operated in push-pull. There may burther be provided a transformer having a primary winding coupled to the second switching means and a plurality of secondary windings for producing the output voltages. For regulation of the final output voltages, the combination may further include means for producing a signal corresponding to the voltage output from the first switching means, means for producing a signal corresponding to the current output from the second switching means, and means for combining the signal corresponding to the voltage output from the first switching means and the signal corresponding to the current output from the second switching means to produce a reference signal. The means for producing one or more signals for operating the first switching means produces pulses at the third rate, the width of the pulses being determined in accordance with the reference signal.

DESCRIPTION OF THE PREFERRED EMBODIMENTS

Figure 1:
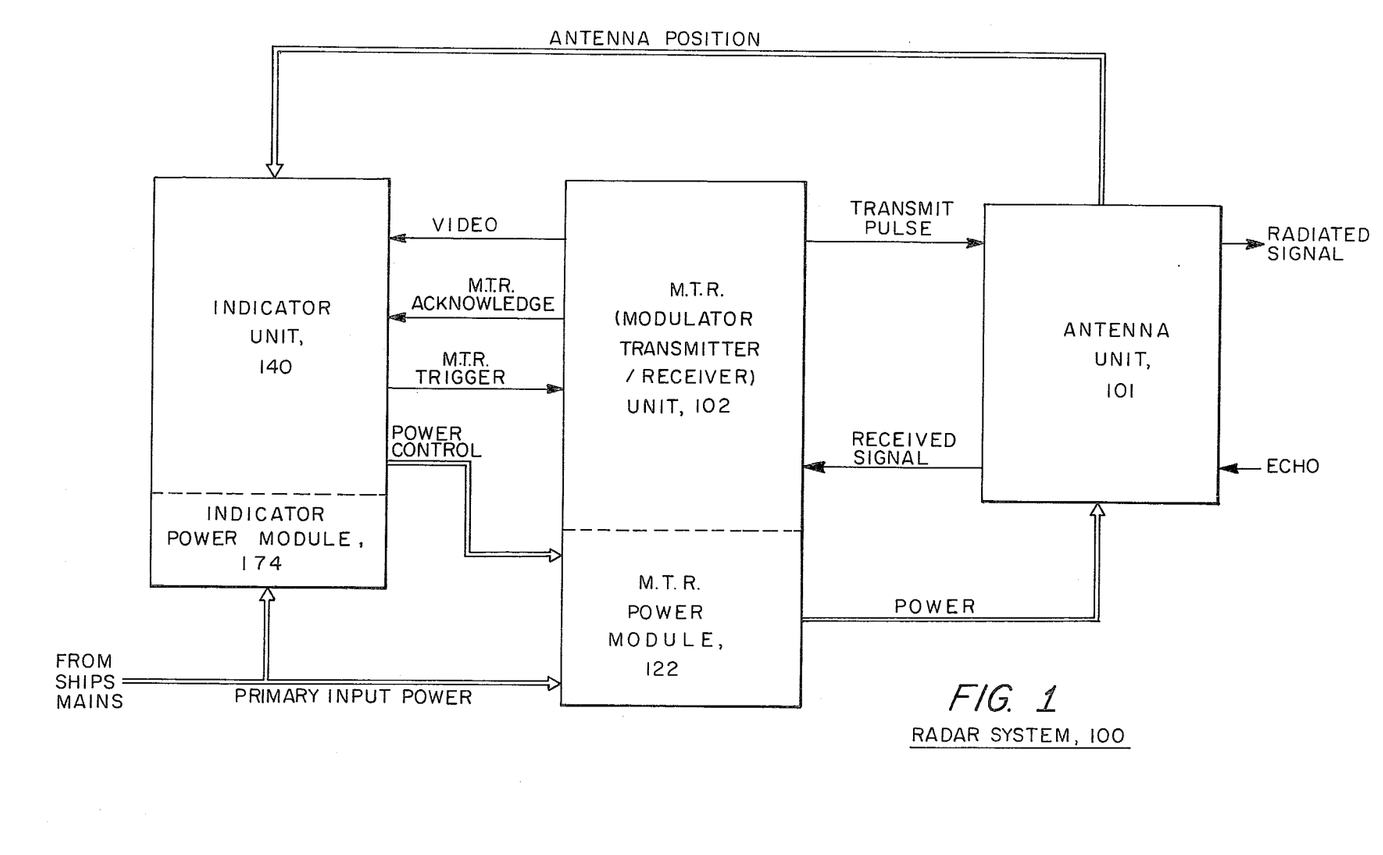
FIG. 1 is a basic block diagram of a radar system of the invention.

Referring first to FIG. 1, there is a basic block diagram of PPI radar system constructed in accordance with the teachings of the present invention. The radar system is constructed from three basic units: indicator unit 140, MTR (modulator-transmitter-receiver) unit 102, and antenna unit 101. Indicator unit 140, which provides the display of radar information and contains the operating controls of the system, is ordinarily mounted upon the bridge of the ship for easy access and convenience for use in navigation. Antenna unit 101 is in practice mounted as high as possible with an unobstructed path for the antenna beam to maximize the range of the unit. MTR unit 102 is located in weather-tight position as close as is practical to antenna unit 101 to minimize losses in the high-power pulses coupld to antenna unit 101 and the low-level receive signals coupled from antenna unit 101 to MTR unit 102.

Both indicator unit 140 and MTR unit 102 contain separate power modules 174 and 122 respectively. Both take the ship's power which may be 110 volts AC 60 cycles or any other normally provided primary input power source and convert it to DC voltages suitable for operating the various electronic circuits and electromechanical devices located within the two units. Additionally, MTR power module 122 supplies operating power to antenna 101 to the motor contained therein for rotation of the antenna. By providing separate power modules in each of the two remotely located major operating units, losses which occurred in previous units in the cabling between units is avoided. Moreover, with the system of the present invention, ON/OFF control of MTR power module 122 is accomplished from indicator unit 140 using only low signal level control voltages. Full control is therefore maintained at the indicator unit without large amounts of power dissipation and loss in long runs of cabling between units.

Each radar pulse cycle is initiated at indicator unit 140 by the production of a MTR TRIGGER pulse which is coupled to MTR unit 102. Upon receipt of this pulse, MTR unit 102 produces a high-power transmit pulse. The transmit pulse is coupled to antenna unit 101 which radiates the signal outward in a narrow beam. Echo return signals from targets are received at antenna unit 101 and relayed to the receiver portion of MTR unit 102. The receiver portion of MTR unit 102 amplifies and detects the received echo signals and produces a video signal to indicator unit 140. The commencement of the video signal is marked by an acknowledge pulse generated within MTR unit 102. Indicator unit 140 produces a visual display of the signals reflected back from targets in the path of the radar beam in accordance with video signal. The azimuthal position of the radar antenna is relayed from antenna unit 101 directly to indicator unit 140 to indicate the angle upon the display screen the returned radar signals are to be displayed.

Figure 2:
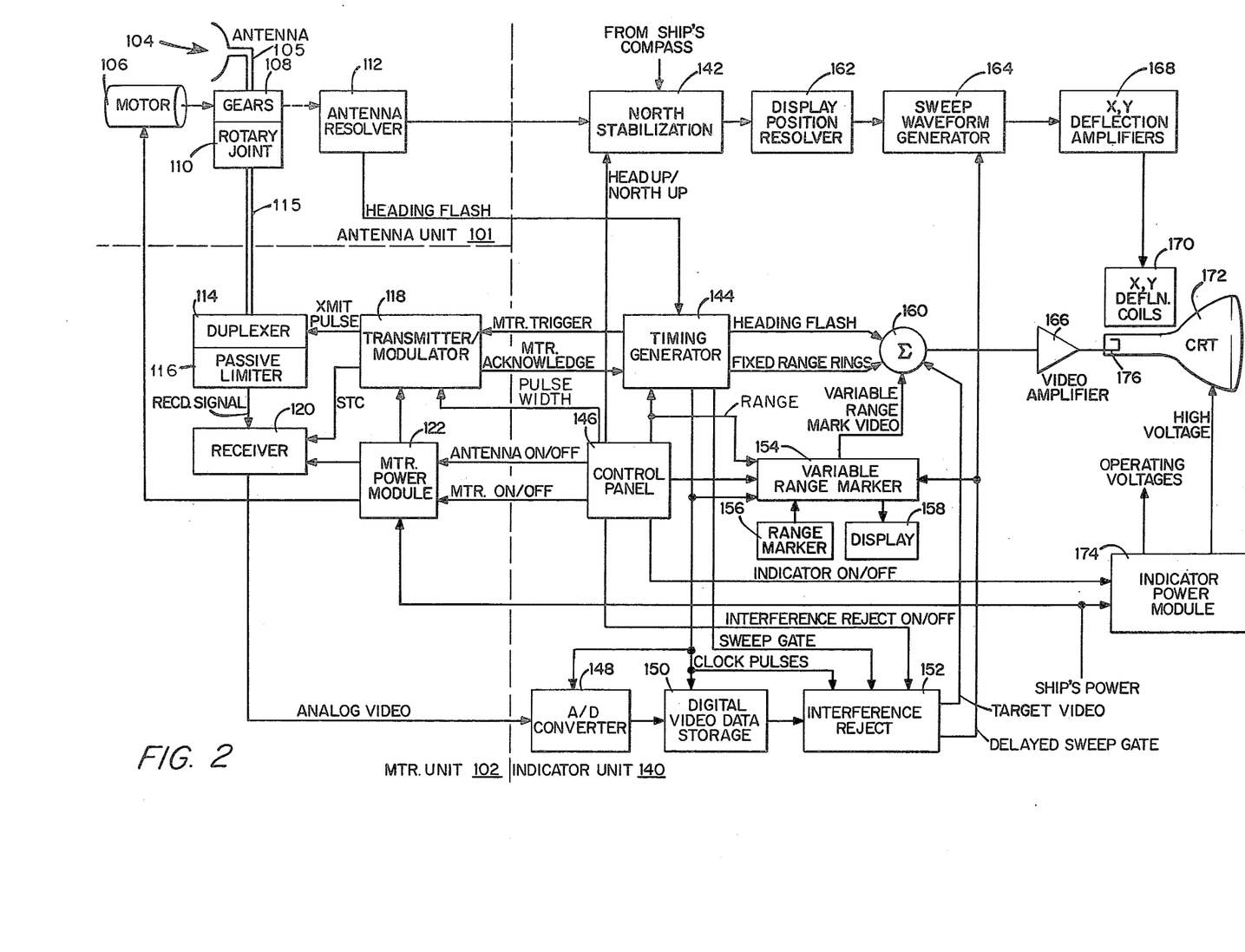
FIG. 2 is a detailed block diagram of a radar system of the invention.

Referring next to FIG. 2, there is shown a detailed block diagram of radar system 100 as shown in FIG. 1. Antenna unit 101 contains a rotatable antenna 104 capable of radiating and receiving signals within the frequency range of the radar pulses. Antenna 104 is rotatably connected to a set of gears 108 through a section of waveguide 105. Motor 106 is mechanically linked to antenna 104 through gears 108 and causes antenna 104 to rotate at a substantially constant and predetermined rate. Antenna resolver 112 is also linked through its input rotary shaft to gears 108 and antenna 104. Its input shaft is rotated preferably at the same rate as antenna 104.

Signals going to and coming from antenna 104 are coupled through rotary joint 110 within antenna unit 101 through waveguide section 115 to duplexer 114. Receive signals are passed through duplexer 114 to passive limiter 116 to the input of receiver 120. Duplexer 114 isolates the transmit pulses produced by transmitter-modulator 118 from receiver 120 and couples the receive signals directly from waveguide 115 to the input of receiver 120 without substantial loss. Passive limiter 116 provides an absolute amplitude limit upon input signals to protect the input circuitry of receiver 120 from being overloaded from signals picked up from nearby radar transmitters.

Transmitter-modulator 118 produces radar pulses in response to an input trigger signal from timing generator 114 within indicator unit 140. The PRF (pulse repetition frequency) of the transmitted radar pulses is entirely determined by the repetition rate of the MTR trigger signal produced by timing generator 144. In previous radar systems in which the PRF was a function of the radar range setting, a plurality of signals indicative of the various possible range settings was coupled to the transmitter-modulator. A decoding circuit then determined the appropriate PRF for the range chosen. With the present system however, only a single trigger signal need be provided.

The width of pulses transmitted may also be a function of the radar range scale setting. It may, for example, be desirable to use a narrower pulse on shorter range scales in order to obtain a greater definition than would be possible using the longer pulses necessary to achieve an acceptable signal-to-noise ratio on the longer ranges. However, it has been found not necessary to provide a different pulse width for every possible range setting value. For example, in the preferred system embodiment of the invention there are 10 different range settings between 0.25 and 64 nautical miles. It has been found that only three different pulse widths of approximately 60, 500, and 1000 nanoseconds are practically required. Only a two bit digital signal then need be coupled between timing generator 144 and transmitter-modulator 118 to select among the three pulse widths. As there are many fewer pulse widths required than are range scale values selectable, many fewer lines or signals need be passed between timing generator 144 and transmitter-modulator 118 than were needed in previous systems.

In previous systems a trigger pulse was generated within the MTR unit which was coupled to both the modulator and display circuitry. Because of certain characteristics of the most commonly employed modulators, the delay time between application of a trigger pulse and generation of the actual transmitted pulse may vary. This is especially true between ranges. Because of this unpredictable delay difference, targets in previously known radar systems would sometimes be displayed having an inaccurate jagged edge caused by the sweep starting either too early or too late. With the system constructed in accordance with the present invention, this problem has been eliminated.

Transmitter-modulator 118 produces an MTR ACKNOWLEDGE pulse at the commencement of each transmit pulse. This MTR ACKNOWLEDGE pulse coupled to timing generator 144 marks the beginning of the start of the radar sweep for each of the video signal processing circuits within indicator unit 140. Because the MTR ACKNOWLEDGE pulse is precisely aligned with the commencement of each radar pulse, registration between adjacent sweep lines upon the displace screen is maintained to a high precision. Thus, the actual shapes of targets are accurately presented with no jagged edges caused by imprecise synchronization of the start of the display sweep with the actual transmitted pulse.

Transmitter-modulator 118 also produces a sensitivity time control (STC) signal to control the gain within receiver 120. As is well-known in the art, the STC signal is used to vary the gain of receiver 120 during each radar pulse. For signals received from targets nearby the gain is reduced. In this manner the amplifying circuitry within receiver 120 is prevented from being overloaded by the strong signals from nearby targets and locally caused interference and a display having a substantially constant brilliance is produced.

The analog video signal produced at the output of receiver 120 is converted to a serial stream of digital data by analog/digital converter 148 within indicator unit 140. The rate at which samples are taken of the analog video signal for digitization and the length of the time period from the start of the radar pulse during which the analog video signal is digitized is dependent upon the radar range scale setting. For the shorter ranges, a higher sampling rate and shorter time period are used.

The digitized video signal is read into digital video data storage memory 150 under control of clock pulses from timing generator 144. Digital video data storage memory 150 stores the digitized video signal from an entire radar pulse time period. The range to which the signal is stored is of course dependent of the range scale setting. The digital video signal is read out of digital video data storage memory 150 for display upon cathode-ray tube 172 in a second time period also determined by the rate of clock pulses coming from timing generator 144. The second time period may be greater than or less than or the same as the first time period during which the video signal was read into digital video data storage memory 150. Read out occurs preferably immediately following the first time period and before commencement of the next succeeding radar time period. In preferred embodiments, the second time period is substantially constant and independent of the first time period. In this manner, with the constant readout time period the writing or deflection rate of the beam of cathode-ray tube 172 is also constant so that the display produced is of constant intensity independent of the radar range scale setting. For short ranges, the second time period during which the digital signals are read out from digital video data storage memory 150 and displayed is substantially greater than the time period during which the signals were read in. Because of the increase in time period, the writing rate of the beam of the cathode ray tube 172 is decreased over that which would be required should the video signal be displayed at the same rate at which it is received. Hence, the brightness of the display upon short ranges is greatly increased over that of previously known systems. Any well-known circuitry can be used to supply the pulses from timing block 144. Preferably the transmitter modulator 118 is driven at the first or pulse repetition rate of approximately 1500 Hz. The clock pulses for writing the digitized video data at a second rate into the data storage 150 is 10 MHz on short ranges, such as 0.5 miles, 1.25 MHz on intermediate ranges such as 12 miles, and 0.3125 MHz on long ranges such as 32 miles. As will be seen, a third rate is 40 KHz. The read out or fourth rate is 1.25 MHz inasmuch as 256 digitized video samples are read out in 205 microseconds. It should be understood that the timing pulses are generated by well-known oscillator and divider circuits.

Interference rejection circuit 152 is provided to nullify the interference effects caused by nearby radar transmitters operating within the same frequency band. This type of interference, caused by reception of the transmitted pulses from the nearby radar, appears as plural spiral arms radiating outward from the center of the radar presentation. Interference rejection circuit 152 operates to substantially cancel this type of interference from the radar presentation without substantially effecting the presentation of desired targets. A switch is located upon control panel 146 which permits the operator to turn interference rejection circuit 152 ON and OFF as desired. The final video output signal produced at the output of interference rejection circuit 152 is coupled to video amplifier 166 via video signal summer 160.

Also provided is variable range marker circuit 154. Variable range marker circuit 154 produces an output video signal in the form of a short pulse for each to display a circular range ring mark at a distance from the center of the radar display determined by the setting of range marker adjustment 156. Range marker adjustment 156 may physically be a part of control panel 146. A display device 158 provides a digital read out to the operator of the distance from the radar antenna to the target upon which the variable range mark is positioned. The output variable range mark video signal from variable range mark circuit 154 is coupled to video amplifier 166 through video signal summer 160.

Timing generator 144 furnishes clock and other timing signals used for the various circuits within indicator unit 140. An internal oscillator within timing generator 144 produces the clock pulses at predetermined periods. The heading flash from antenna resolver 112 which is produced each time the antenna beam passes the forward direction of the ship is reclocked by the clock pulses produced by the oscillator within timing generator 144 and coupled as a video pulse through video signal summer 160 to video amplifier 166 to produce a mark on the screen to indicate to the operator when the antenna beam so passes the bow of the ship. Timing generator 144 also produces the MTR TRIGGER signal as a pulse at predetermined fixed intervals depending upon the radar range scale setting as relayed from control panel 146. The MTR ACKNOWLEDGE signal from transmitter-modulator 118 is used by timing generator 144 to produce a SWEEP GATE signal which is a logic signal which assumes the high or active state in the time period during which video signals are being received. The SWEEP GATE signal is set in the active state as soon as the MTR ACKNOWLEDGE signal is received and set to the low or inactive state at the end of the time period depending upon the range setting selected.

Upon control panel 146 are mounted the various operator actuable controls for adjusting and determining the operation of the various circuits within the radar system. A range control is provided that determines the maximum range at which targets are to be displayed. This distance corresponds to the distance at the edge of the cathode ray tube screen. ON/OFF switches are provided for operating MTR power module 122, motor 106 of antenna 101 via MTR power module 122, interference rejection circuit 152, variable range marker circuit 154, and indicator power module 174. A switch is provided to select between head up (the direction in which the ship is pointing) or north up at the top of the display presentation.

For generating displays in which north rather than the current ship's heading is represented at the top of the display screen, north stabilization circuit 142 modifies the signals received from antenna resolver 112 before coupling them to display position resolver 162. Otherwise, for displays in which the ship's heading is displayed at the top of the screen, the signals from antenna resolver 112 are coupled directly to display position resolver 162. Display position resolver 162 takes the output signals from either antenna resolver 112 or north stabilization circuit 142 in the form of modulated sine and cosine waveforms and produces therefrom DC voltages for each radar sweep representing X and Y sweep increments. Sweep waveform generator 164 produces X and Y ramp waveforms, the maximum amplitudes of which are determined by the DC voltages from display position resolver 162. Generation of the two ramp waveforms commences at the time marked by the beginning of the DELAYED SWEEP GATE signal from interference rejection circuit 152 which in turn was produced by delaying the SWEEP GATE signal from timing generator 144 by one or more clock periods to permit interference rejection circuit 152 to perform its operation. The X and Y ramp waveforms are each coupled to X and Y deflection amplifiers 168 where they are amplified and coupled to X and Y deflection coils 170 for deflecting the beam of cathode ray tube 172 in the manner well-known in the art. The output of video amplifier 166 is coupled to cathode 176 of cathode ray tube 172 for modulating the beam intensity thereof.

The high voltage applied to the accelerating anode of cathode-ray tube 172 and all other operating voltages for the various circuits within indicator unit 140 including the voltages for biasing and operating all the logic circuits contained therein are provided by indicator power module 174. Indicator power module 174 is, as is MTR power module 122, preferably a switching power supply capable of producing at its output a plurality of voltages having the required current furnishing capabilities. The switching frequency of indicator power module 174 and that of MTR power module 122 are selected intermediate the PRF rate as determined by timing generator 144 in accordance with the range setting and the rate of digitization of the analog video signal by analog/digital converter 148. By operating the power modules at a switching rate intermediate the PRF and digitization rates, interference effects are eliminated.

Figure 3:
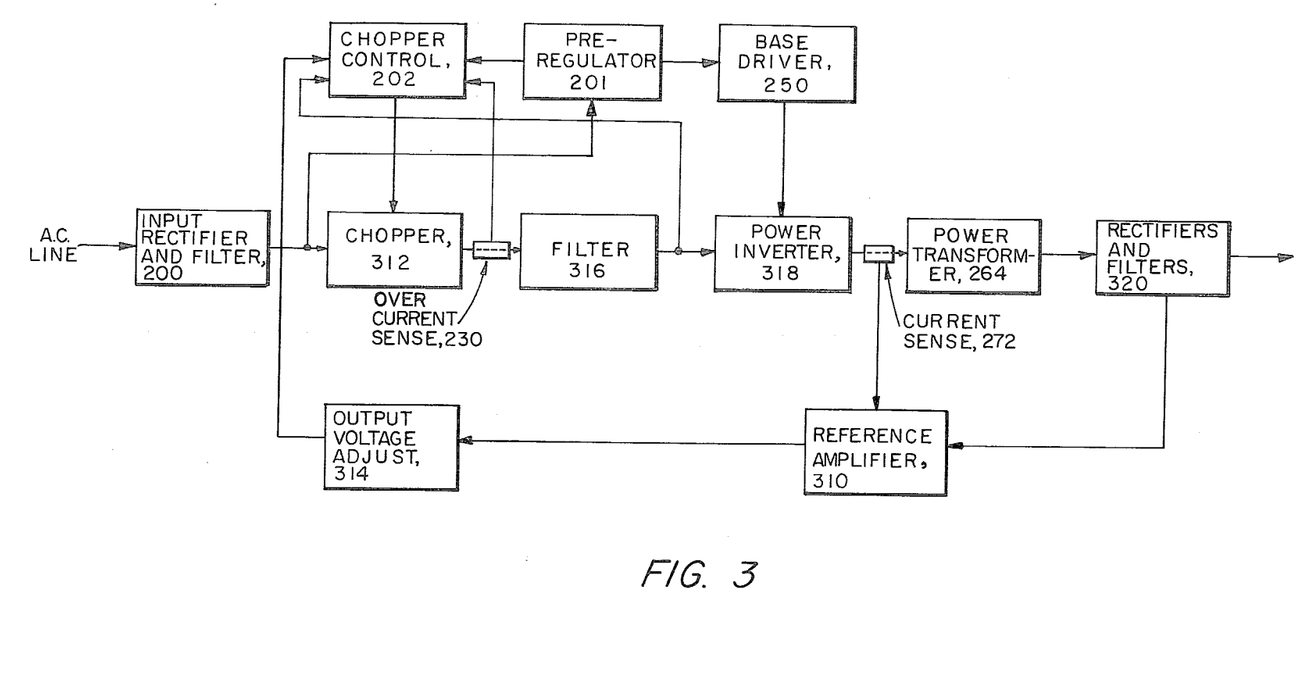
FIG. 3 is a block diagram of a power module according to the invention.

Referring next to FIG. 3 there is shown a block diagram of a power supply and in particular one of power modules 122 in FIG. 2. It is to be noted that all power modules are substantially similar in structure but with different output voltages provided as required. Each power module may include one or more of the power supplies as shown in the block diagram of FIG. 3 as required for the particular voltages and currents to be supplied.

The input AC or DC line voltage is coupled to input rectifier and filter 200 which produces an unregulated DC voltage. This unregulated DC voltage is applied to chopper 312 where it is switched in a controlled duty cycle fashion as controlled by chopper control 202. The output of chopper 312 is applied through filter 316 to power inverter 318. Drive for power inverter 318 is applied by base drive 250. Preregulator circuit 201 supplies bias voltages, produced from the unregulated DC input voltage to chopper 312, for base driver 250 and chopper control 202. Power inverter 318 chops the filtered DC voltage at a predetermined rate chosen to be higher than the PRF rate but lower than the digitization rate of the video signal. In this manner, interference among circuitry operating at the varying rates is minimized.

The chopped output from power inverter 318 is coupled to the primary of power transformer 264. Multiple secondary windings are provided in accordance with the desired output voltages. Rectifiers and filters 320, connected to the various secondary windings of power transformer 264, produce the desired DC output voltages at the requisite smoothness. Output voltage regulation is achieved by regulating the input voltage applied to power inverter 318 through filter 316 as produced on the output of chopper 312. Two separate current senses are made, one at the output of chopper of 312 and the other at output of power inverter 318. Reference amplifier 310, biased by output voltages from rectifiers and filters 320, amplifies the sensed output from power inverter 318 to an appropriate level to be mixed with the voltage sense sample taken at the output of chopper 312 through filter 316. Output voltage adjust circuit 314 scales the sensed magnitude to provide a control voltage to the input of chopper control circuit 202.

Figure 4A:
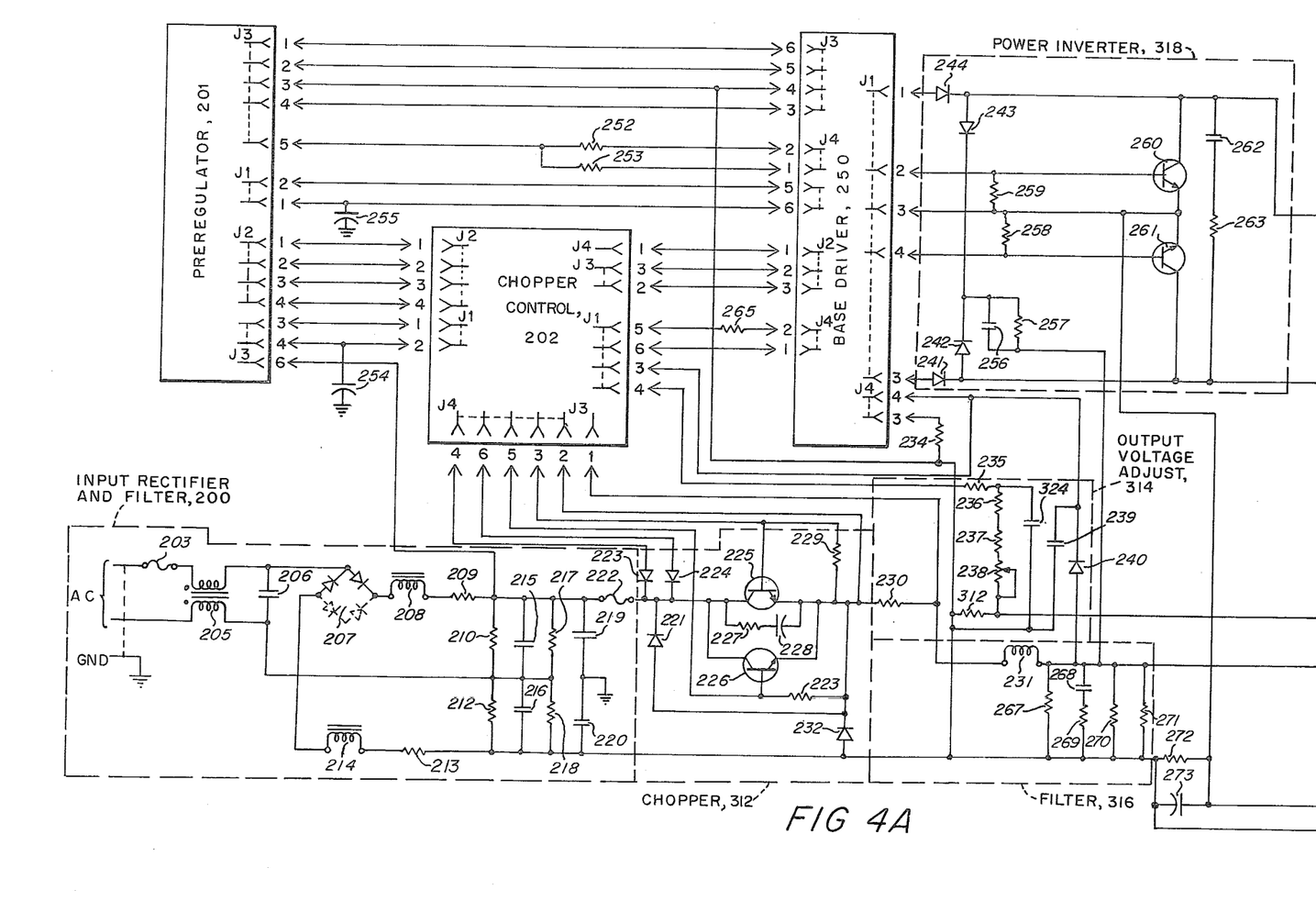
FIGS. 4A and 4B are a schematic diagram of a preferred embodiment of a power module of the invention.
Figure 4B:
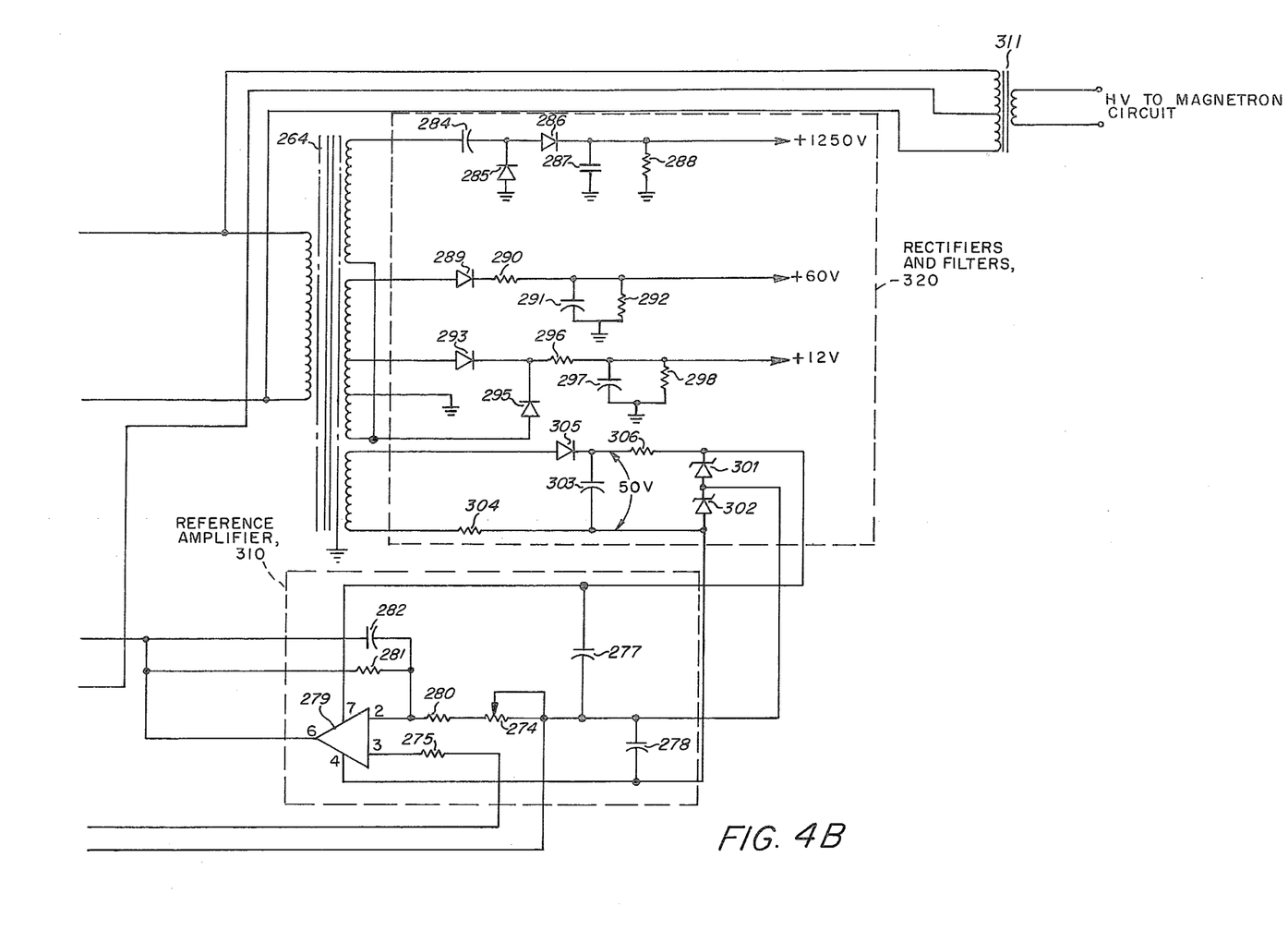

Referring now to the diagrams of FIGS. 4A, 4B, 5, and 6 the detailed implementation of a preferred embodiment will be described. Referring first to FIGS. 4A and 4B, the input line voltage is applied to input rectifier and filter circuit 200 through fuse 203 and input RFI choke 205 and rectifiers 207. Four diodes 207 in a full-wave rectifying bridge are used for either 220 volts AC or DC inputs while two diodes in a half-wave rectifying voltage-doubler mode are used for 115 volts AC. Input capacitors 215 and 216 are coupled in series in the full-wave mode and in the voltage doubler mode. The input appears as an unregulated DC voltage in the range of 250–350 volts DC at the input to step-down chopper transistors 225 and 226 as coupled through soft-start thermistors 209 and 213 and RFI chokes 208 and 214.

The appropriate off-on duty cycle for transistors 225 and 226 within chopper circuit 312 is determined by chopper control circuit 202 by controlling the width of turn-on pulses applied to the bases of each transistor. Variations in the switching regulator or chopper output voltages are fed back as error signals to chopper control 202 where they are processed to determine the appropriate duty-cycle pulse width for the desired output voltages. Filter circuit 316, including choke 231, capacitor 268, and resistors 267 and 269–271, averages the output from chopper circuit 312 to a controlled DC level in the range of 120–190 volts depending upon the output load requirements and voltages.

The controlled 120–190 volts DC from the output of filter 316 establishes the operating voltage for power inverter circuit 318 consisting primarily of transistors 260 and 261. Transistors 260 and 261 are operated in a push-pull mode to drive the center tapped primary of power transformer 264. An approximately 90% duty cycle is used to provide a maximum power transfer. Small adjustments in the pulse widths applied to the two transistors are made by base driver 250 in a manner to be described to provide a current balance between the two transistors.

At the secondary of power transformer 264 three separate secondary windings are shown, one of which has multiple taps to provide several different operating voltages. The output circuitry is shown by way of example only as other arrangements of secondary taps and rectifiers and filters may be used to provide any combination of output voltages. In the example given, the uppermost secondary tap is used to provide 1250 volts DC for operating the modulator tube of transmitter/modulator 118. +12 and +60 volts DC are also produced as well as operating voltages for reference amplifier 310. Zener diodes such as diodes 301–302 may also be provided for additional voltage output stabilization. Also provided is high voltage transformer 311 which is used to produce the anode supply voltage for the magnetron output tube within transmitter/modulator 118.

Figure 5:
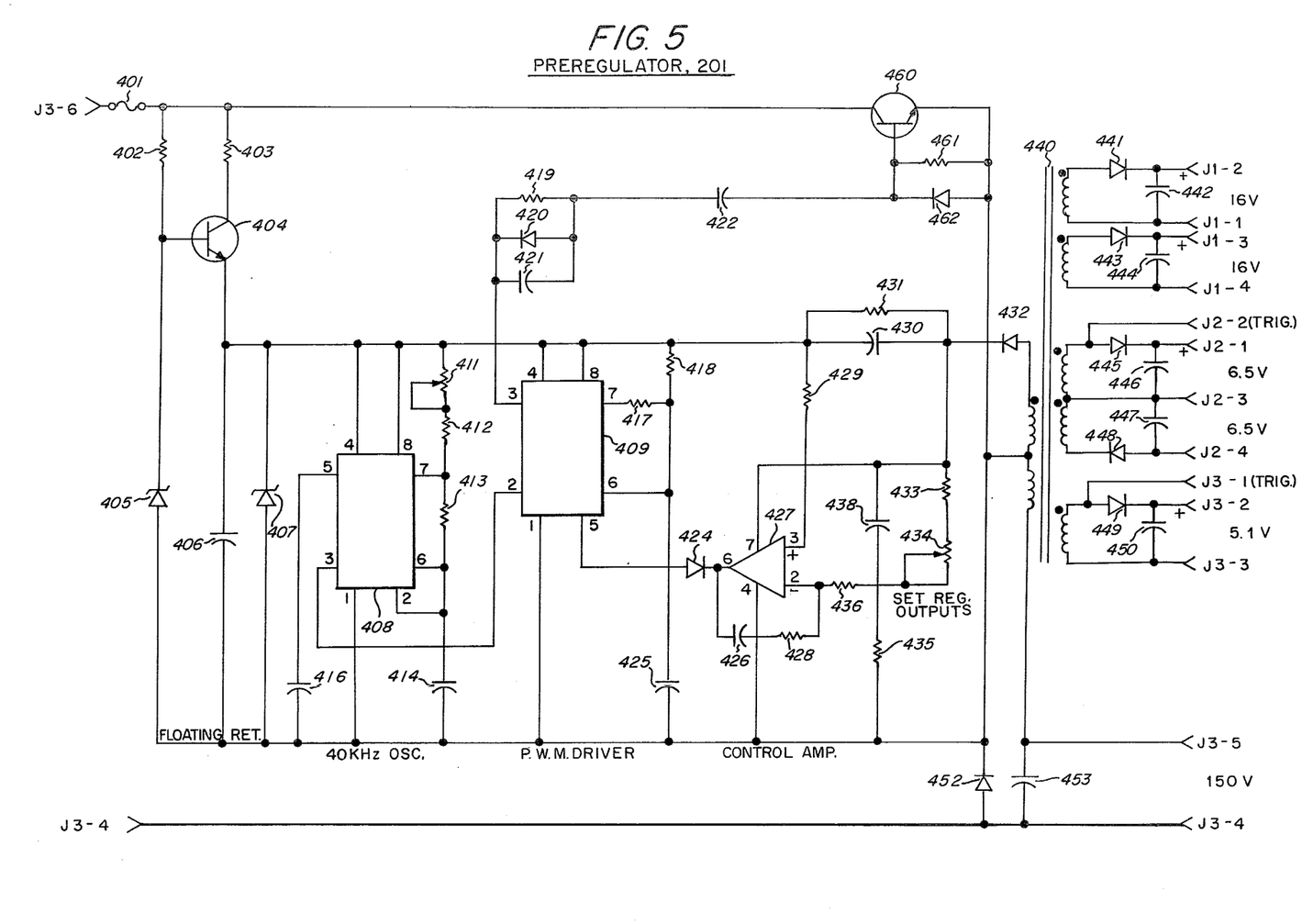
FIG. 5 is a schematic diagram of the preregulator circuit of the power module of FIGS. 4A and 4B.

Referring next to FIG. 5 the operation of preregulator circuit 201 will be described. The basic function of preregulator circuit 201 is to provide the bias and operating voltages for the various circuits within the power supply other than the high power switched and output voltages. The basic input to preregulator circuit 201 is the unregulated DC output from input rectifier and filter circuit 200 with a nominal voltage of 300 volts DC. This is applied through input fuse 401 to the collector of switching transistor 460 to the center tap of the primary of bias transformer 440. During system turn-on, the start-up circuit, consisting primarily of transistor 404, provides a starting bias for circuit operation until the proper DC level of bias for preregulator control is established at bias transformer 440.

A 40 KHz square wave reference signal is produced by the 40 KHz oscillator circuitry at the output (pin 3) of timer 408. The frequency of this square wave is determined by resistors 411–413 and capacitor 414 and adjusted by variable resistor 411. This square wave signal ultimately determines the duty cycle for switching transistor 460 as applied by the pulse width modulated driver section of the circuitry, the primary component of which is timer 409. The instantaneous voltage applied to input pin 6 of timer 409 is a function of the time constant of resistor 418 and capacitor 425. After being triggered by the square wave 40 KHz signal on pin 2 of timer 409, the voltage at pin 6 begins to increase until it reaches the level of the error signal voltage applied to pin 5. This time period determines the on-time of the duty cycle control of switching transistor 460 and thus the primary voltage of bias transformer 440. The voltage at pin 6 then begins to decay until a subsequent trigger pulse applied to pin 2 repeats the process. As the error signal voltage applied to pin 5 varies, so does the ON-TIME of the duty cycle.

The portion of the primary winding of transformer 440 to which diode 432 is coupled serves two purposes: to provide bias for overall preregulator circuit operation and to establish the voltage at the input of amplifier 427 for producing the error signal voltage applied to timer 409. The variations in the output voltages upon the various secondary windings are reflected in the voltage across this primary winding. The voltage thus applied to the input of amplifier 427 varies the DC level at output pin 6 of amplifier 427 to adjust the duty cycle of switching transistor 460 as required to maintain 150 volts DC across the remaining portion of the primary of bias transformer 440. Effectively, this regulation maintains the voltage across capacitor 453, which functions partly as an LC filter with the primary at a constant 150 volts DC. This assures accurate bias levels at the transformer secondaries. Variable resistor 434 may be adjusted to set the output secondary voltages at their appropriate levels.

Figure 6:
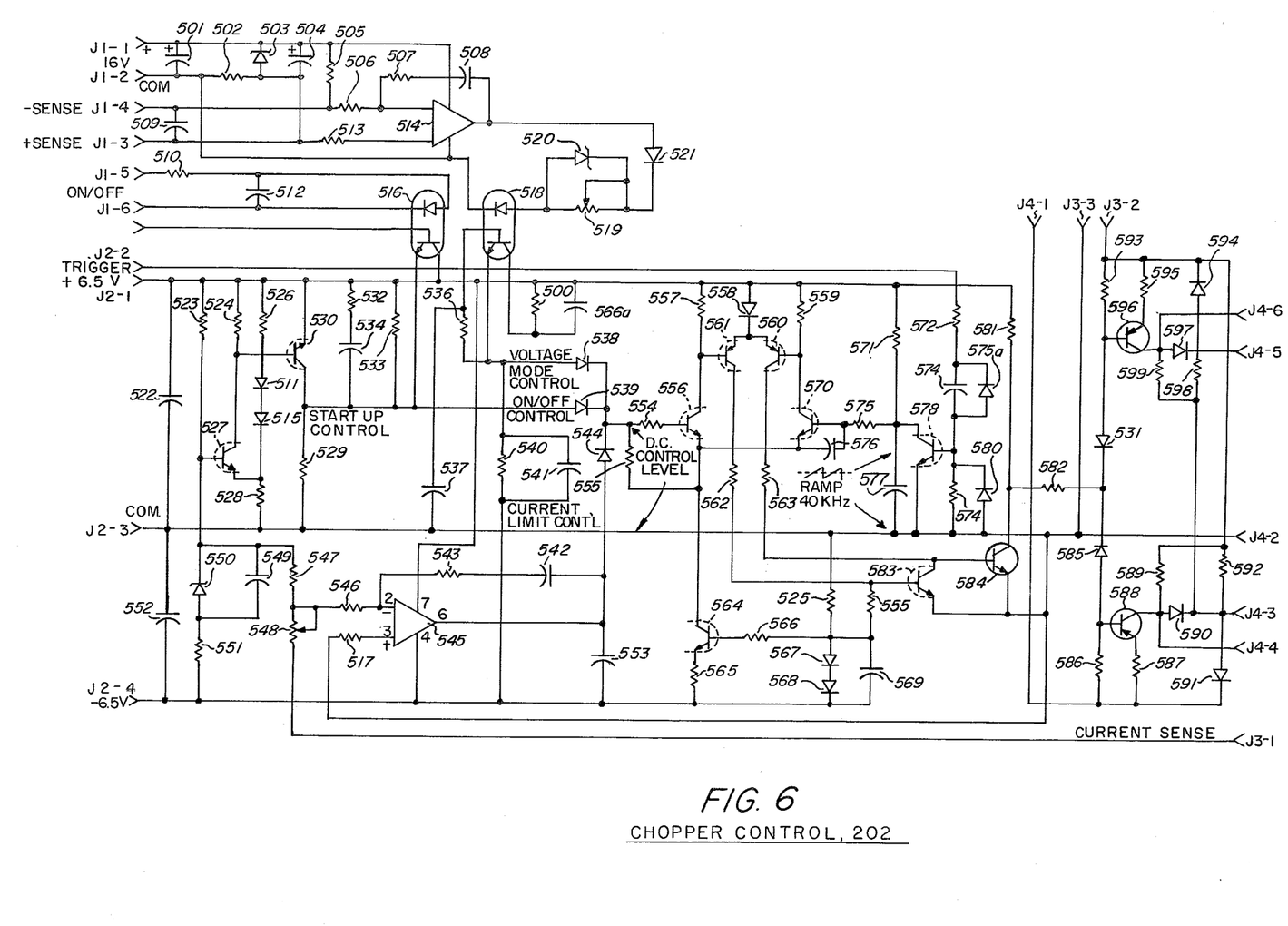
FIG. 6 is a schematic diagram of the chopper control circuit of the power module of FIGS. 4A and 4B.

Reference is next made to FIG. 6 showing a schematic diagram of chopper control circuit 202. Chopper control circuit 202 contains the circuitry which controls the duty cycle pulse width to the input drive signals to chopper 312 thus stabilizing the overall power supply output voltages. Three primary circuits within chopper control circuit 202 contribute to this control. These are the voltage error amplifier (voltage sense amplifier 514 and opto-electric isolator 518), low voltage sensing and logic shut down (transistors 527 and 530 and opto-electric isolator 516), and the current-limiting error amplifier (amplifier 545). The output of each of these circuits appears as a DC error input to the analog "OR" gate consisting of diodes 538, 539, and 544. The "OR" gate passes the larger of the three input voltages into the constant current comparator circuit including amplifying transistors 556, 560, 561, and 570. Here the output is compared to the relatively constant 40 KHz ramp signal developed by a trigger from preregulator circuit 201 appearing across capacitor 577. The comparator outputs at the collectors of transistors 560 and 561 are in the form of square-wave pulses which are positive at the base of transistor 584 for ON time control and complementary negative going for turn-OFF as applied to the base of transistor 583. The resultant voltage at the collector of transistor 584 is applied simultaneously to bias driving transistors 588 and 596 still at the 40 KHz repetition rate.

Only one of base drive transistors 588 and 596 are activated at any one time as their emitters are coupled across the 4.5 volt secondary output of transformer 440 of preregulator circuit 201. Thus while one of transistors 588 and 596 is ON, the other must necessarily be OFF. Since the transformer waveform is synchronized at the 20 KHz rate with the comparator operating at 40 KHz, only alternate outputs are fed to chopper transistors 225 and 226 of chopper circuit 312.

In an operating situation, any tendency of the supply output to increase is sensed through the voltage sense amplifier at the inputs of amplifier 514. The output of amplifier 514 controls the operating level of opto-electrical isolator 518 and hence the voltage at the anode of diode 538 increasing the gate level to the comparator and thus narrowing the width of the pulse which controls the ON time of the chopper transistors as the supply output increases.

Operating in the current mode, the voltage across diode 544 is the controlling voltage from amplifier 545. A fixed voltage at diode 539 determined by the ratio of the resistances of resistors 529 and 533 establishes a maximum pulse width to prevent chopper transistors 225 and 226 of chopper circuit 312 from being ON at the same time avoiding damaging thereto.

Transistors 527 and 530 provide for cutting off the duty cycle in the event of a low bias voltage condition. When the input bias voltage drops below a predetermined level, transistor 530 turns ON applying a DC voltage at diode 539 greater than the ramp voltage level. The duty cycle output of the comparator is cut off completely disabling chopper transistors 225 and 226.

Figure 7:
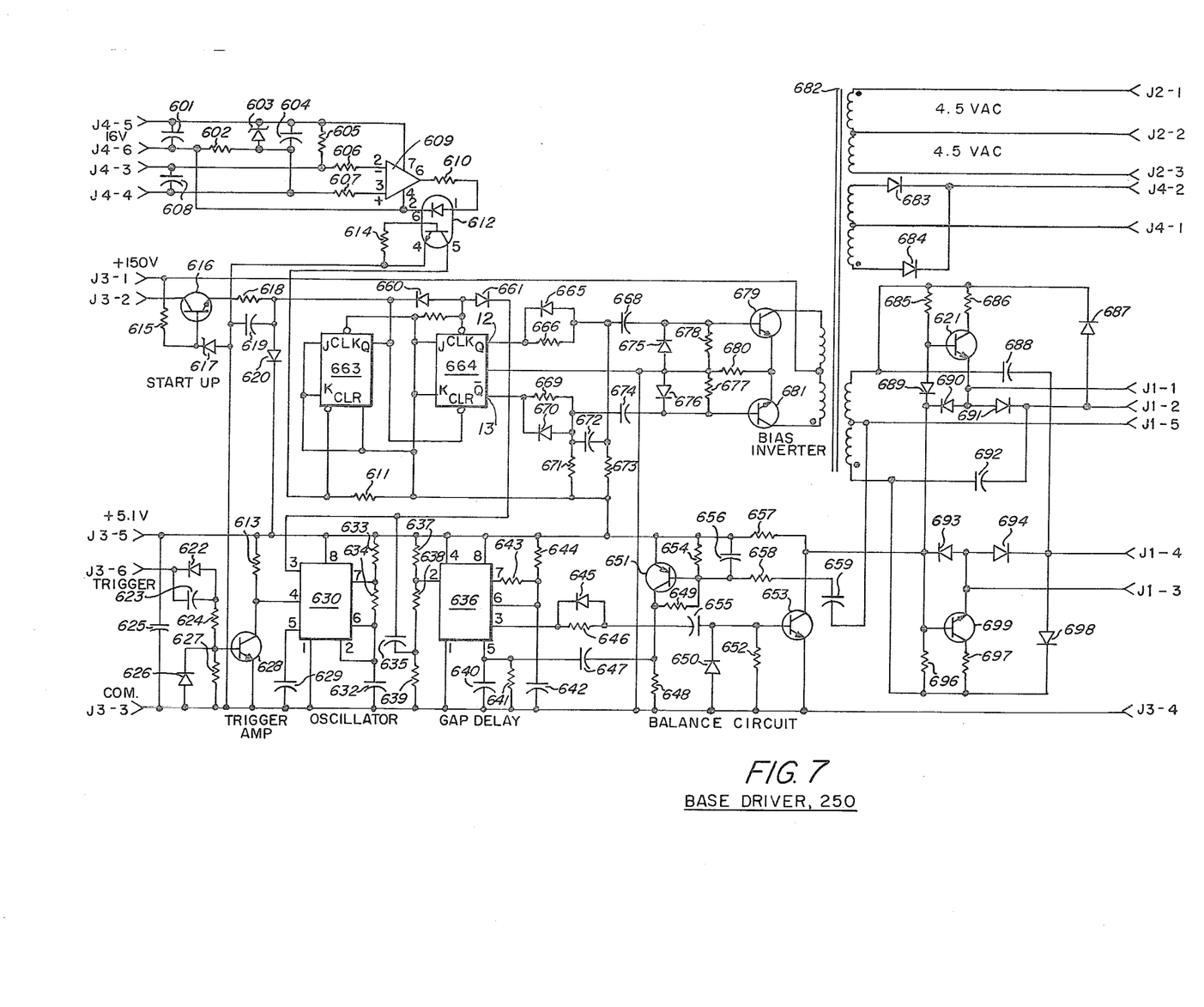
FIG. 7 is a schematic diagram of the base driver circuit of the power module of FIGS. 4A and 4B.

Reference is next made to FIG. 7 showing a schematic diagram of base driver circuit 250. Base driver circuit 250 provides the major functions of base drive to power switching transistors 260 and 261 of power inverter 318, bias current supply for internal use, and overvoltage sensing shut-off capability.

A start-up circuit including transistor 616 provides a 5 volt operating potential for flip/flop 663 and 664 and start-up voltage for timing circuits 630 and 636 and associated circuitry. When the voltage at input J3-5 from preregulator circuit 201 reaches its operating +5 volt level, diode 620 becomes reverse biased shutting off transistor 616. Five volt operating voltage is then supplied directly from the incoming 5 volt line.

The trigger input from preregulator circuit 201 is amplified by trigger amplifier transistor 628 for synchronization of the reference clock signal produced by the oscillator consisting primarily of timer 630 and associated timing components. During the start up time, the reference clock free-runs until the bias voltage comes up to its operating point. At this time, timer 630 is synchronized with the reference clock from preregulator circuit 201. A narrow 40 KHz clock pulse is generated at output pin 3 of timer 630 which in turn triggers flip/-flops 663 and 664. The outputs of flip/flop 664 on pins 12 and 13 alternate states with each subsequent clock pulse establishing the base drive for bias inverter transistors 679 and 681.

The 40 KHz clock from timing circuit 630 is also applied to the balance control comparator including timer 636 and its associated resistor and capacitor timing components. The output duty cycle at output pin 3 of timing circuit 636 is inverted through transistor 653 of the balance error amplifier portion of the circuitry and applied to the bases of transistors 621 and 699. With the 20 KHz signal applied to the drivers through transformer 682 and the 40 KHz pulse applied to each base, only alternate clock outputs appear as driver outputs to the main inverter switching transistors 260 and 261 of power inverter 318. The width of the pulse at output pin 3 of timing circuit 636 determines the OFF time for transistors 260 and 261 and establishes the appropriate current balance between transistors 260 and 261. The pulse width typically 2.5 microseconds, and hence the OFF time is governed by the error amplifier including transistor 651 which feeds back an error signal voltage to input pin 5 of timing circuit 636. The greater the error, the wider will be the pulses generated by timing circuit 636. The proper current balance for transistors 260 and 261 of power inverter 318 is therefore maintained.

Transformer 682 is the bias current source for the logic ON/OFF bias, base drive to chopper control transistors 588 and 596 of chopper control 202, and base drive to transistors 260 and 261 of power inverter 318. Primary drive for transformer 682 is furnished by drive transistors 679 and 681 operated in the push/pull mode. Transistors 679 and 681 are controlled by base drive inputs from flip/flop 664. Flip/flop 664 is synchronized with the 40 KHz clock signal as discussed previously. Flip/flop 664 thus provides a 20 KHz push/pull output for the bias inverter base drive.

An overvoltage protection circuit is provided including amplifier 609 and opto-electric isolator 612. Under normal output supply conditions, pin 9 of flip/flop 663 remains high which maintains a positive voltage output to the bias inverter circuitry. In the event of an overvoltage condition at the supply output, amplifier 609 reacts through input sense lines coupled to the outputs of filter circuit 316. A current is then driven through opto-electric isolator 612 causing the output transistor therein to conduct and to apply a logic low signal to pin 6 of flip/flop 663, the CLEAR input. The output at pin 9 of flip/flop 663 goes low subsequently forcing low the CLEAR input to flip/flop 664 clearing that flip/flop also. Flip/flop toggling action is thereby inhibited removing the base drive to the bias inverter circuitry and shutting off the supply. The input power to the system must be turned OFF then ON again in order to continue operation.

Referring back to FIG. 4 the generation of the error control voltage will be described. The sensed voltage coupled to voltage sense amplifier 514 within chopper control circuit 202 is in actuality a composite voltage made up of the sums of two separate sensed signals. By using two sensed signals rather than one as was previously the case, it has been found that more precise control may be maintained over the ultimate output voltages.

The first of the sense signals is developed across resistor 272 in series with the coupled emitters of power inverter transistors 260 and 261. The voltage across transistor 272 thus varies in accordance with the output current load upon the secondary of transformer 264. Reference amplifier 310 amplifies this voltage to an appropriate level. The second of the sense voltages is developed across resistor 267 at the output from filter 316. Two sensed voltages are combined across resistors 236–238 with the composite sense voltage coupled to chopper control 202. Variable resistor 238 provides a magnitude adjustment in the sense voltage to permit operator adjustment of the ultimate output voltages.

This completes the description of the preferred embodiments of the invention. Although preferred embodiments have been described, it is believed that numerous modifications and alterations thereto would be apparent to one having ordinary skill in the art without departing from the spirit and scope of the invention.

APPENDIX I

Parts List

FIGS. 4A – 4B

Resistors

| | |
|---|---|
| 209, 213 | 5 at 25° C |
| 210, 212, 217, 218, | 220K, ¼W, 2% |
| 227 | 100, 2W, 5% |
| 229, 233, 258 | 150, ¼W, 2% |
| 259 | |
| 230 | 0.33, 3W, 10% |
| 234 | 200K, ¼W, 2% |
| 235 | 10K |
| 236 | 75K |
| 237 | 30K |
| 238 | 10K, ¾W, 2% |
| 252 | 10K, 5W, 5% |
| 253 | 68, ¼W, 2% |
| 257 | 56K, 2% |
| 263 | 680, 5W |
| 265 | 100, 1W |
| 267 | 30K, 2W, 2% |
| 269 | 2, 2K, 5W, 5% |
| 270 | 30K, 2W, 2% |
| 271 | 30K, 2W, 2% |
| 272 | 0.22, 5W, 2% |
| 274 | 1K, ¼W, 20% |
| 275 | 680 |
| 280 | 750 |
| 281 | 30K |
| 288 | 660K, 6W |
| 290 | 470, 1W |
| 292 | 1 MEG, ¼W, 1% |
| 296 | 10, ¼W |
| 298 | 10K, ¼W |
| 299 | 680, 2W |
| 304 | 22, ¼W |
| 306 | 1K, 1W |
| 312 | 10K |

Capacitors

| | |
|---|---|
| 206 | 0.1, 600V |
| 215, 216 | 1000, 200V |
| 219, 220 | 0.0047, 2KV |
| 228 | 250 pf, 500V |
| 229 | 022, 250V |
| 254, 255 | .001, 1KV |
| 256 | 0.22, 500V |
| 262 | 470 pf, 500V |
| 268 | 75, 300V |
| 273 | 100, 10V |
| 277, 278 | 1.0, 50V |
| 282 | 0033, 250V |
| 284 | .02, 1KV |
| 287 | 0.1, 2KV |

APPENDIX I-continued
Parts List

| | |
|---|---|
| 291 | 260, 75V |
| 297 | 15, 35V |
| 303 | 39, 75V |
| 324 | 0.0047, 500V |
| Diodes | |
| 207 | Raytheon 588096-6 |
| 223, 224, 240, 241, 242, 243, 244, | Raytheon 587306-8 |
| 232 | Raytheon 588605-4 |
| 285, 286 | Raytheon 167899-1 |
| 289, 293, 295, 305 | Raytheon 587306-6 |
| 300 | 1N5242B |
| 301 | 1N4750A |
| 302 | IN5236B |
| Fuses | |
| 203 | 8 amps |
| 222 | 3 amps |
| Transistors | |
| 260, 261, 225, 226 | 2N6545 |
| Integrated Circuit | |
| 279 | Raytheon 741C |
| Transformers | |
| 264 | Raytheon 167125-1 |
| 310 | Raytheon 167136-1 |
| Inductors | |
| 205 | Raytheon 167884-1 |
| 208, 214 | Raytheon 167885-1 |
| 231 | Raytheon 167886-1 |

FIG. 5

| | |
|---|---|
| Resistors | |
| 402 | 150K, ½W |
| 403 | 15K, 1W |
| 411 | 1K, ½W |
| 412 | 5.1K |
| 413 | 330 |
| 417 | 680 |
| 418 | 3.6K |
| 419 | 680 |
| 428 | 33K |
| 429 | 1K |
| 431 | 470 |
| 433 | 51K |
| 434 | 1K, ½W |
| 435 | 5.6K |
| 436 | 1K |
| 461 | 680 |
| Capacitors | |
| 406 | 22, 15V |
| 414 | .0047, 200V |
| 416 | .01, 25V |
| 421 | .001, 1KV |
| 422 | .068, 250V |
| 425 | .0047, 200V |
| 426 | .01, 25V |
| 430 | 22, 15V |
| 438 | .047, 250V |
| 442 | 6.8, 25V |
| 444 | 6.6, 25V |
| 446 | 22, 15V |
| 447 | 22, 15V |
| 450 | 22, 15V |
| 453 | 1, 350V |
| Diodes | |
| 405 | 1N5234B |
| 407 | 1N825 |
| 420 | 1N4148 |
| 424 | 1N4148 |
| 432 | 1N4148 |
| 441 | 1N4148 |
| 443 | 1N4148 |
| 445 | 1N4148 |
| 448 | 1N4148 |
| 449 | 1N4148 |
| 452 | 1N4148 |
| 462 | 1N4148 |
| Integrated Circuits | |
| 408, 409 | Signetics NE555 |
| 427 | Fairchild 741C |
| Transistors | |
| 404 | 2N3440 |
| 460 | 2N6177 |
| Transformer | |
| 440 | Raytheon 167360-1 |
| Fuse | |
| 401 | 1/10 amp |

FIG. 6

| | |
|---|---|
| Resistors | |
| 500 | 1K |
| 502 | 15K |
| 505 | 6.19K, ½W, 1% |
| 506 | 10 |
| 507 | 15K |
| 510 | 150 |
| 512 | 10K |
| 513 | 2.2K |
| 517 | 5.6K |
| 519 | 2K, ½W |
| 523 | 470 |
| 524 | 5.6K |
| 525 | 1K |
| 526 | 1.5K |
| 528 | 1.5K |
| 529 | 1K |
| 533 | 10K |
| 535 | 5.6K |
| 536 | 100K |
| 540 | 4.7K |
| 543 | 2.2K |
| 546 | 5.6K |
| 547 | 4.7K |
| 548 | 1K, ½W |
| 551 | 47K |
| 554 | 1K |
| 555 | 10K |
| 557 | 5.6K |
| 559 | 5.6K |
| 562 | 1K |
| 563 | 1K |
| 565 | 300 |
| 566 | 1K |
| 571 | 10K |
| 572 | 1K |
| 574 | 1K |
| 575 | 1K |
| 581 | 2.2K |
| 582 | 10 |
| 586 | 330 |
| 587 | 10, 1W |
| 589 | 680 |
| 592 | 680 |
| 593 | 330 |
| 595 | 10, 1W |
| 598 | 680 |
| 599 | 680 |
| Capacitors | |
| 501 | 6.8, 25V |
| 504 | 10 10V |
| 508 | .015, 250V |
| 509 | .01, 25V |
| 512 | .01, 25V |
| 522 | 22, 15V |
| 534 | 10, 10V |
| 537 | 10 pf, 300V |
| 541 | .001, 100V |
| 542 | .01, 25V |
| 549 | 10, 10V |
| 552 | 22, 15V |
| 553 | .01, 25V |
| 566a | .001, 100V |
| 569 | 10, 10V |
| 574 | 680 pf, 300V |
| 576 | 820, 300V |
| 577 | .01, 250V |
| Diodes | |
| 503 | 1N625 |
| 511 | 1N4148 |
| 515 | 1N4148 |
| 520 | 1N5240B |
| 521 | 1N4148 |
| 531 | 1N4148 |
| 538 | 1N4148 |
| 539 | 1N4148 |
| 550 | 1N825 |
| 558 | 1N4148 |
| 567 | 1N4148 |
| 568 | 1N4148 |
| 575a | 1N4148 |
| 580 | 1N4148 |
| 585 | 1N4148 |
| 590 | 1N4148 |
| 591 | 1N4148 |
| 594 | 1N4148 |
| 597 | 1N4148 |
| Integrated Circuits | |

APPENDIX I-continued
Parts List

| | |
|---|---|
| 516, 518 | Texas Instruments TIL 114 |
| 545, 514 | Raytheon 741C |
| Transistors | |
| 527, 530, 556, 560, 561, 564, 570, 578, 583 | RCA CA3096E |
| 584 | 2N2219A |
| 588 | 2N2905A |
| 596 | 2N2905A |

FIG. 7

| Resistors | |
|---|---|
| 602 | 1.5K |
| 605 | 6.19K, 10W, 1% |
| 606 | 1K |
| 607 | 1K |
| 610 | 680 |
| 611 | 5.6K |
| 613 | 5.6K |
| 614 | 100K |
| 615 | 150K, ½W |
| 618 | 10 |
| 624 | 680 |
| 627 | 1K |
| 633 | 6.2K |
| 634 | 150 |
| 637 | 2.2K |
| 638 | 1K |
| 639 | 2.2K |
| 641 | 6.2K |
| 643 | 1K |
| 644 | 6.2K |
| 646 | 680 |
| 648 | 1K |
| 649 | 100K |
| 652 | 680 |
| 654 | 33K |
| 657 | 2.2K |
| 658 | 4.7K |
| 662 | 10K |
| 666 | 680 |
| 669 | 680 |
| 671 | 1K |
| 673 | 1K |
| 677 | 680 |
| 678 | 680 |
| 680 | 4.7, ½W |
| 685 | 150 |
| 686 | 10, 1W |
| 696 | 150 |
| 697 | 10, 1W |

| Capacitors | |
|---|---|
| 601 | 6.8, 25V |
| 604 | 10, 10V |
| 608 | .01, 25V |
| 619 | .01, 25V |
| 623 | 470, 300V |
| 624 | .01, 25V |
| 625 | 22, 15V |
| 632 | .0047, 200V |
| 635 | 390 pf, 300V |
| 640 | .001, 1KV |
| 642 | .001, 100V |
| 647 | .0047, 100V |
| 655 | .22, 100V |
| 656 | .01, 25V |
| 659 | .01, 25V |
| 668 | .22, 100V |
| 672 | .001, 1KV |
| 674 | .22, 100V |
| 688 | .001, 1KV |
| 692 | .001, 1KV |

| Diodes | |
|---|---|
| 603 | 1N825 |
| 617 | 1N5232B |
| 620 | 1N4148 |
| 622 | 1N4148 |
| 626 | 1N4148 |
| 645 | 1N4148 |
| 650 | 1N4148 |
| 661 | 1N4148 |
| 665 | 1N4148 |
| 670 | 1N4148 |
| 675 | 1N4148 |
| 676 | 1N4148 |
| 683 | 1N4148 |
| 684 | 1N4148 |
| 687, 690, 691, 693, 694, 698 | Raytheon 586379-4 |
| 689, 695 | 1N4148 |

APPENDIX I-continued
Parts List

| Transistors | |
|---|---|
| 616 | 2N3440 |
| 628 | 2N2222 |
| 629 | 2N2219A |
| 651 | 2N2907A |
| 653 | 1N2219A |
| 679 | 2N6177 |
| 681 | 2N6177 |
| 699 | 2N2219A |

| Integrated Circuits | |
|---|---|
| 609 | Fairchild 741C |
| 612 | Texas Instruments TIL 114 |
| 630, 636 | Signetics NE555 |
| 663, 664 | Texas Instruments SN74LS73N |

| Transformer | |
|---|---|
| 682 | Raytheon 167354-1 |

Note: Unless otherwise specified, all capacitor values are in microfarads; all resistor values are in ohms; and all resistors are ¼ watt, 2%.

What is claimed is:

1. In combination:

means for transmitting radar pulse signals at a first rate;

means for providing digital samples of radar return signals at a second rate;

switching power supplying means including a switching regulator feeding an inverter having a frequency above the audible range for providing electrical power to said transmitting means and said digital sample providing means, said switching power supplying means operating at a third rate;

means for preventing interference effects by operating said third rate intermediate said first and second rate, said second rate being variable with the radar range setting;

means for providing switching regulator pulses;

means for varying the width of said switching regulator pulses operating at said third rate to regulate the output voltage in accordance with a composite voltage derived from simultaneously sensing the switching regulator output voltage and inverter current to improve regulation;

means for storing for substantially a single pulse period said digital samples; and means for reading out of said samples from said storing means at a fourth rate which is constant with each range, said fourth rate being less than or equal to said second rate which latter rate varies in accordance with the radar range setting.

2. In combination;

means for transmitting radar pulse signals at a first rate;

means for providing digital samples of radar return signals at a second rate;

switching power supplying means including a switching regulator feeding an inverter having a frequency above the audible range for providing electrical power to said transmitting means and said digital sample providing means, said switching power supplying means operating at a third rate;

means for preventing interference effects by operating said third rate intermediate said first and second rate; said second rate being variable with the radar range setting;

means for providing switching regulator pulses;

for varying the width of said switching regulator pulses operating at said third rate to regulate the output voltage in accordance with a composite voltage derived from simultaneously sensing switching regulator output voltage and inverter current to improve regulation;

means for storing for substantially a single pulse period said digital samples;

means for reading out said samples from said storing means at a fourth rate which is constant with each range, said fourth rate being less than or equal to said second rate which varies in accordance with the radar range setting; and said samples being read into said storing means at said second rate, said latter rate operating far in excess of said third rate.

3. The combination of claim 2 wherein: said fourth rate is constant among at least some of said radar range settings.

* * * * *